A. JANSSON.
MAP METER.
APPLICATION FILED MAR. 5, 1921.
1,405,417.
Patented Feb. 7, 1922.
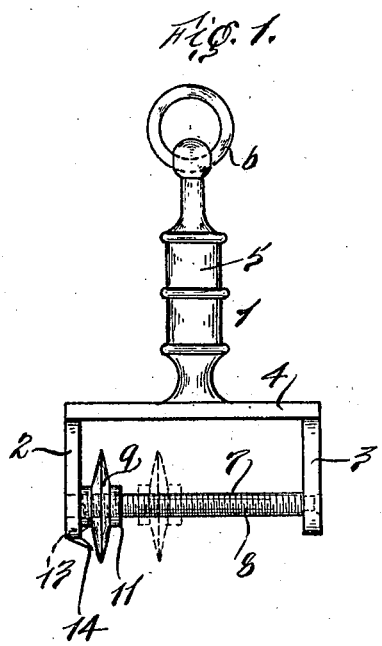
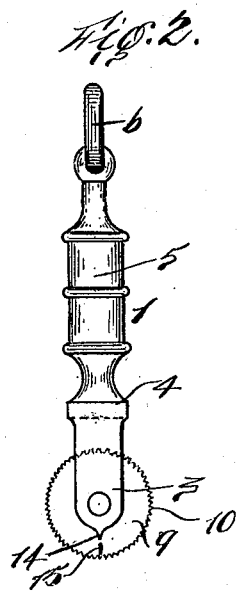
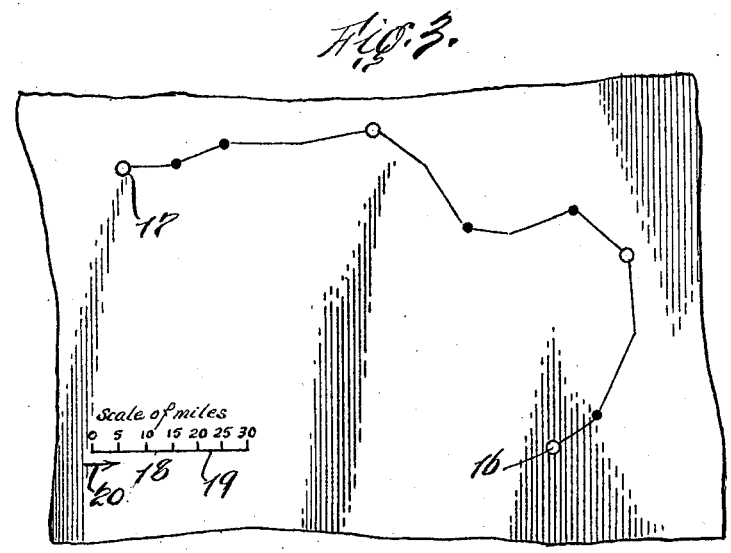
Inventor
Arvid Jansson
By his Attorney
Edward A. Jarvis

UNITED STATES PATENT OFFICE.

ARVID JANSSON, OF BROOKLYN, NEW YORK.

MAP METER.

1,405,417.  Specification of Letters Patent.  Patented Feb. 7, 1922.

Application filed March 5, 1921. Serial No. 449,794.

*To all whom it may concern:*

Be it known that I, ARVID JANSSON, a citizen of the United States, residing at Brooklyn, county of Kings, State of New York, have invented certain new and useful Improvements in Map Meters, of which the following is a full, clear, and exact description.

This invention relates to improvements in map meters or devices to measure the distance between given points upon a map in accordance with a scale of miles associated with the map. My invention is designed to obviate the necessity of dividers, rulers, etc., and will be found valuable for the use of engineers, military men, including aviators, or for any other purpose where the distance between points, indicated on a may, is desirable. My improved measuring device is arranged in the form of a roller that can be caused to follow a line upon a map at the same time move away from a given point or stop which is afterwards employed to assist in ascertaining the distance between given points.

I will now proceed to describe my invention, reference being had to the accompanying drawing, wherein:—

Fig. 1 is a face view of my improved device, enlarged;

Fig. 2 is a side view thereof; and

Fig. 3 is a diagrammatic view of a map, containing a scale.

As herein arranged, my improved measuring device consists of a frame or carrier 1 having spaced apart jaw members 2 and 3 carried by a bar 4 which in turn is carried by a post 5 provided with a ring 6. The jaw members 2 and 3 support a spindle 7, having a thread 8 of very slight pitch. The spindle 7 will be fixed, that is to say, will not rotate. The spindle 7 supports a roller or tracer disk 9 having a serrated peripheral edge 10. The disk 11 carries a hub 12, which is bored and threaded at 13 to engage the threads 8. The disk 9 will, of course, be rotatably supported by the spindle 7 and will travel longitudinally thereof when in use to measure distances. The jaw member 2 may be provided with a pointer 14 to register with an index mark 15 on the disk 13 to indicate that the disk 13 is in contact with the jaw member or stop 2, as said position will be the starting and also the finishing position of the disk 13. To ascertain the distance between given points upon a map, say the point indicated by 16 and the point indicated by 17, I would first rotate the disk 13 to cause it to contact with member 2, should it at the time be out of contact therewith; secondly I would place the roller upon point 16 and pull the instrument along the line upon the map, connecting points 16 and 17. As the disk rotates, the frame 1 will move longitudinally of the axis of the disk 13, Fig. 1. When point 17 is reached, the instrument will be raised off the map, the disk 13 will now be spaced from jaw member 2. To ascertain the distance in miles between points 16 and 17, I would place the disk 13 on the zero point of the scale 18 and move it along line 19 in the direction of the arrow 20. When performing this operation, the instrument will be pushed instead of pulled along line 19; hence, the rotation of the disk 13 will be reversed, causing it to move toward jaw member or stop 2. The movement of the instrument along 19 will be continued until the disk reaches the last index mark, which in this instance is thirty miles, and if disk 13 has not contacted with jaw member 2, the operation of moving the instrument along line 19 from left to right in this instance, will be repeated. Should, during this second movement, the disk 13 contact with jaw member or stop 2, it will cease rotating and the point at which rotation ceased will be noted, say for instance, the twenty mile mark. As the instrument had been moved, the full length of line 19, I would set down thirty miles and add to same the distance the disk traveled during the second operation which was twenty miles; hence, the distance between points 16 and 17 is fifty miles.

To sum up, the instrument will be moved along the scale of miles until the disk 13 ceases to rotate. At the same time a record of the number of times that the disk travels the full length of the scale will be noted and in the final counting the number of such movements will be multiplied by the distance represented by the scale to which will be added the distance traveled by the disk during its last movement or the movement during which the disk contacted with its stop. As the disk 13 has a serrated edge 10, it will dig into the material of the map. As the disk will be caused to follow a line, the frame will move longitudinally of the axis of the disk; hence, the jaw member 2 will move away from the disk while the instrument is being pulled along a line. And when the instrument is pulled along the scale of miles, the jaw member 2 will move toward disk 13 and will finally contact therewith after a sufficient number of operations have been performed. The device will be constructed small enough to be worn as a watch charm, although it is illustrated as much larger.

Having described my invention, what I claim is:—

1. In a map meter, a movable carrier, a threaded spindle fixedly connected to the carrier, and a rotatable tracer element threaded on the spindle, all arranged so that when the tracer is caused to follow a line, the carrier will be moved longitudinally of the axis of the tracer, thereby changing the distance between the tracer and ends of the carrier for the purposes of measurement.

2. In a map meter, a movable carrier, a tracer element movably supported by the carrier and means arranged to move the carrier longitudinally of the axis of the tracer to charge the distance between the tracer and ends of carrier when said tracer and carrier are moved along a given line, for the purposes of measurement.

3. In a map meter, a movable carrier, a threaded rotatable tracer disk associated therewith, said carrier and tracer disk being movable relatively to each other longitudinally of the axis of the disk, and a threaded element associated with the threaded disk and arranged to move said carrier to cause a given point thereon to become spaced from the tracer during the movement of the disk along a line for the purposes of measurement.

4. In a map meter, a movable carrier, a threaded rotatable tracer disk associated therewith, said carrier and tracer disk being movable relatively to each other longitudinally of the axis of the disk, and a threaded element associated with the threaded disk and arranged to move said carrier to cause a given point thereon to become spaced from the tracer during the movement of the disk along a line, when moved in one direction, and to cause the disk and given point on said carrier to approach each other when said disk is moved along a line in the opposite direction for the purposes of measurement.

Signed at New York city, N. Y., this 2nd day of March, 1921.

ARVID JANSSON.

Witnesses:
EDMUND D. TITUS,
H. J. MUELER.